(12) United States Patent
Dixon

(10) Patent No.: US 9,743,584 B1
(45) Date of Patent: Aug. 29, 2017

(54) MOWER BLADE SYSTEM

(71) Applicant: Carl R. Dixon, Weiner, AR (US)

(72) Inventor: Carl R. Dixon, Weiner, AR (US)

( * ) Notice: Subject to any disclaimer, the term of this patent is extended or adjusted under 35 U.S.C. 154(b) by 112 days.

(21) Appl. No.: 14/704,882

(22) Filed: May 5, 2015

Related U.S. Application Data

(60) Provisional application No. 61/988,768, filed on May 5, 2014.

(51) Int. Cl.
*A01D 34/73* (2006.01)
*A01D 34/63* (2006.01)

(52) U.S. Cl.
CPC ............ *A01D 34/73* (2013.01); *A01D 34/63* (2013.01); *A01D 34/733* (2013.01)

(58) Field of Classification Search
CPC combination set(s) only.
See application file for complete search history.

(56) References Cited

U.S. PATENT DOCUMENTS

| 2,232,261 | A | * | 2/1941 | Orr | A01D 34/78 56/17.4 |
| 2,477,442 | A | * | 7/1949 | Cramer, Jr. | A01D 34/63 16/437 |
| 3,321,894 | A | * | 5/1967 | Ingram | A01D 34/63 56/295 |
| 3,683,606 | A | * | 8/1972 | Staines | A01D 34/733 56/295 |
| 4,229,933 | A | * | 10/1980 | Bernard | A01D 34/733 56/295 |
| 2008/0277127 | A1 | * | 11/2008 | Dixon | A01D 34/733 172/552 |

* cited by examiner

*Primary Examiner* — Alicia Torres
(74) *Attorney, Agent, or Firm* — Schrantz Law Firm, PLLC; Stephen D. Schrantz

(57) ABSTRACT

The mower blade system provides one or more blades, preferably two, secured to a housing that is attached to the mower. The blades provide a cutting edge that is sharpened for mowing the yard, lawn, field, or other area. The blade attaches to an attachment arm via a locking body and retention body. A pivot aperture of the blade is placed upon a pivot finger of the attachment arm that secures the blade on the attachment arm. The locking body abuts the pivot finger to secure the blade on the pivot finger. The retention body then slides over the locking body to further secure the blade on the pivot finger.

18 Claims, 28 Drawing Sheets

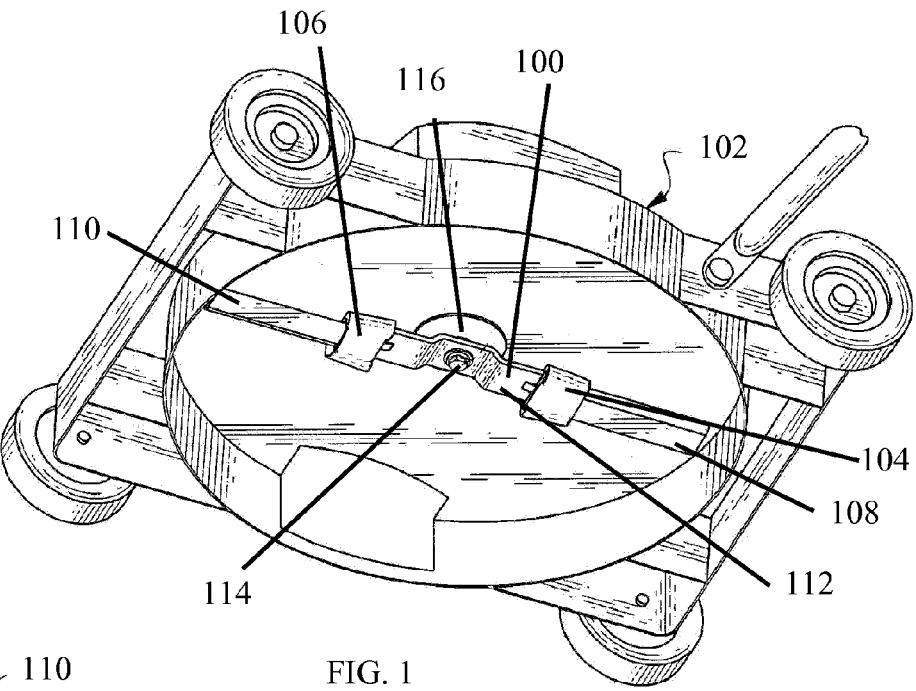
FIG. 1
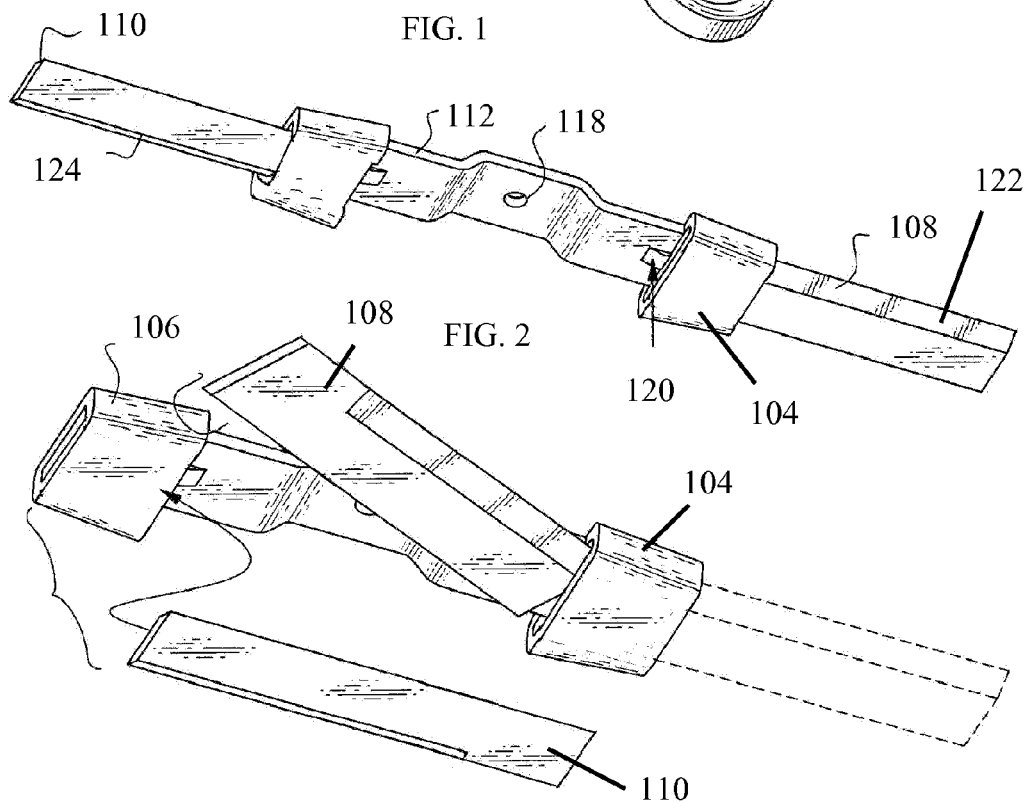
FIG. 2
FIG. 3

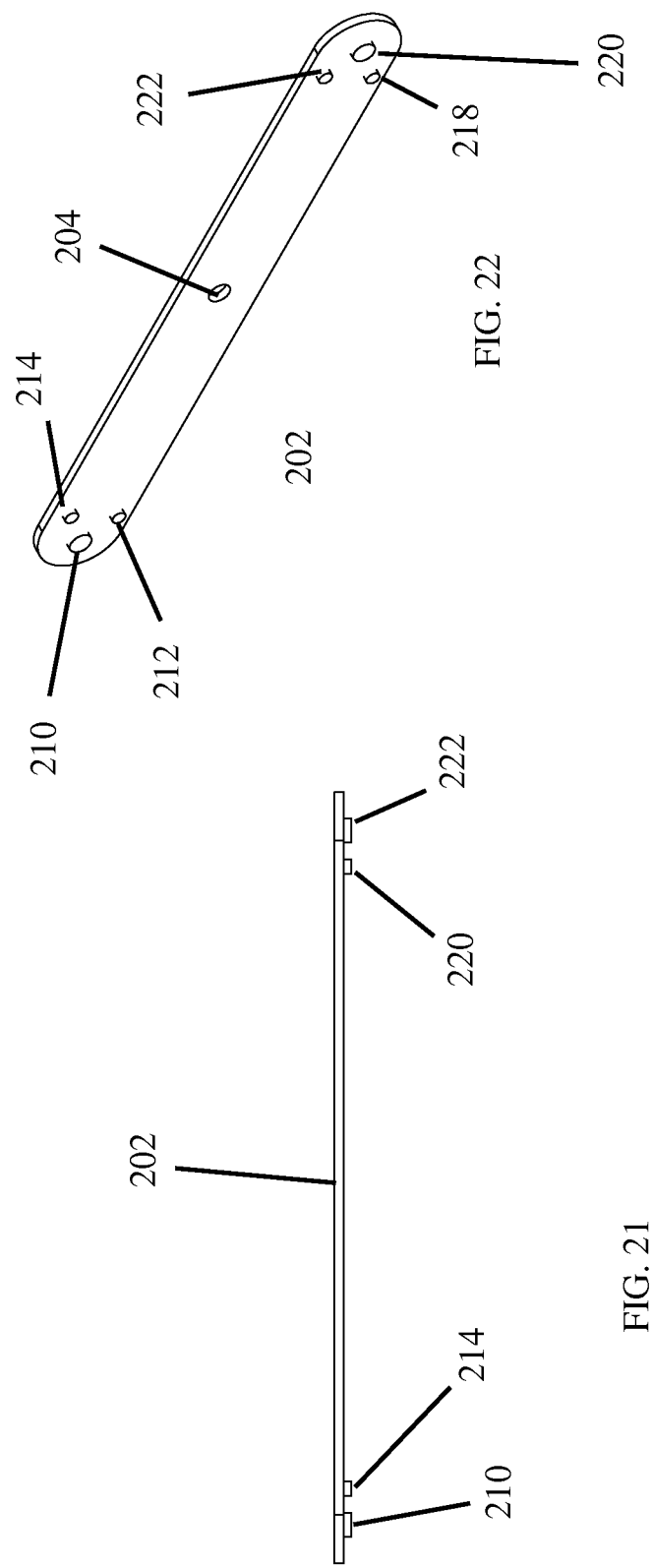

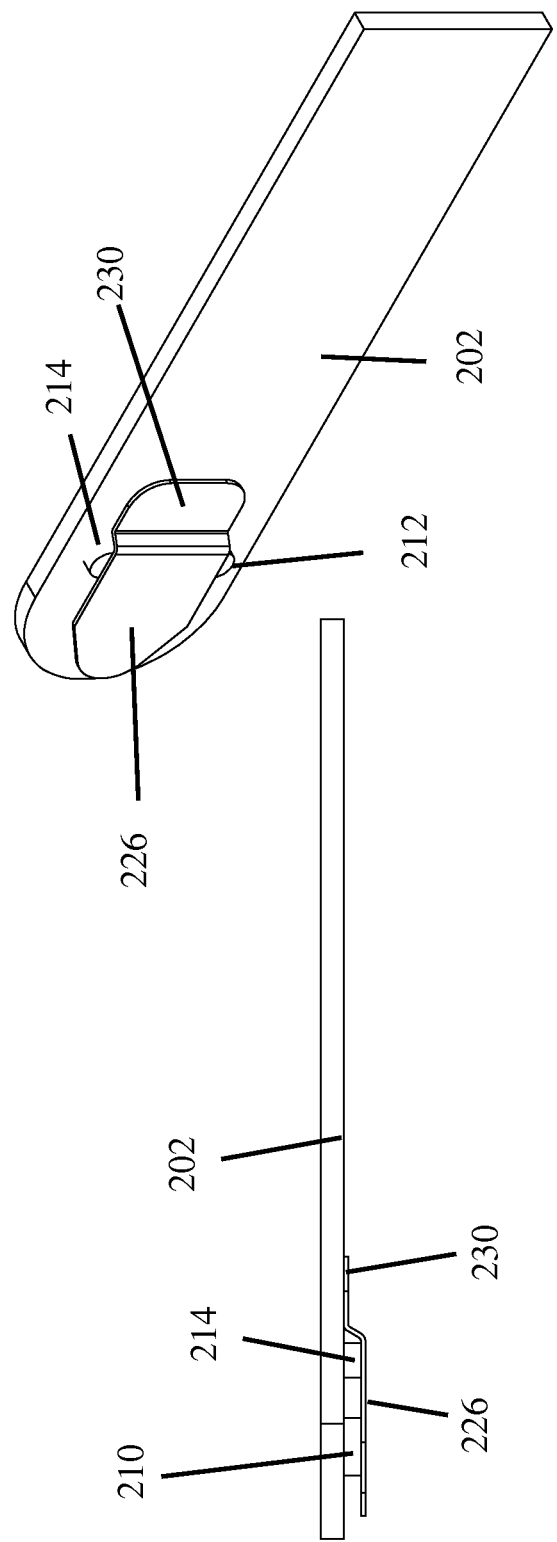

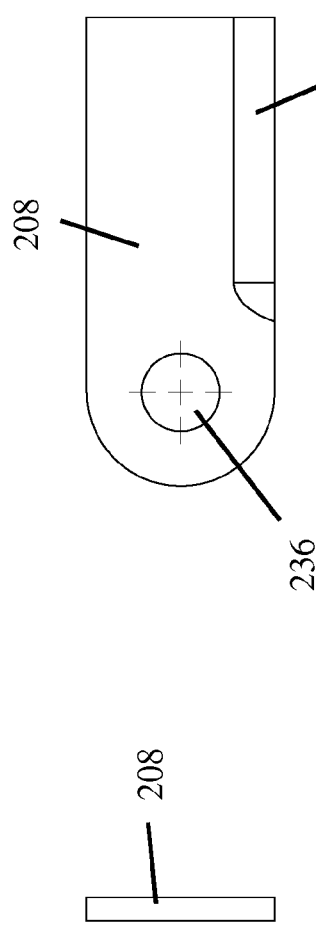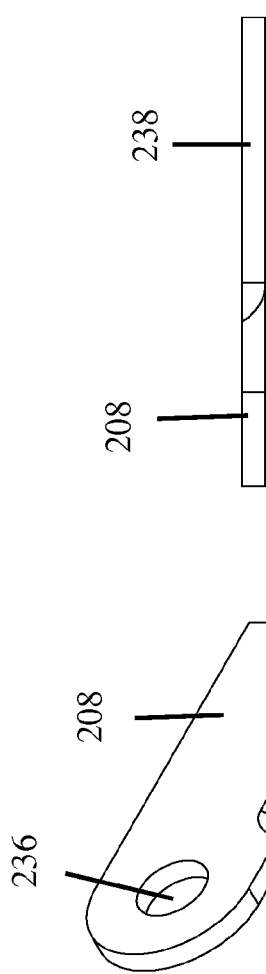
FIG. 32
FIG. 33
FIG. 34
FIG. 35

MOWER BLADE SYSTEM

CROSS-REFERENCE TO RELATED APPLICATIONS

This application claims priority to and is a continuation in part of U.S. Patent Application No. 61/988,768 entitled MOWER BLADE SYSTEM filed on May 5, 2014.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates generally to a mower blade system with replaceable blades secured within a housing attached to the mower. The mower blade system enables a user to quickly and conveniently remove the blades and install a blade as needed. The user may also turn over the blade to provide a new sharp edge on the cutting side.

Rotary mowers have a blade that rotates about a central point, typically a spindle. The end sections of the blade are sharpened and are designed to cut, and sometimes mulch, the material which comes within the housing as the mower is moved over a grassy surface, e.g., a lawn.

Over time, the blades contact rocks, sticks, concrete, and other hard objects that dull or damage the blades. The blades also wear and dull over time with use of the mower. The user must then replace the blades to achieve a better mowed lawn. The known art requires a user to exert a great amount of effort and time to replace the blades. The blades of the present invention are easily replaceable. Thus, the present invention saves time and effort required to replace the blades.

2. Description of the Known Art

Patents and patent applications disclosing relevant information are disclosed below. These patents and patent applications are hereby expressly incorporated by reference in their entirety.

U.S. Pat. No. 6,205,755 issued to Bontrager, et al. on Mar. 27, 2001 ("the '755 patent") teaches a blade that is secured to a blade adapter which is dimensioned to receive a fixed adapter. The fixed adapter taught by the '755 patent is connected to the engine drive shaft of a rotary mower. The blade and fixed adapter taught by the '755 patent are provided with cooperating surfaces which permit the adapters to be selectively locked together and separated from each other without requiring tools.

U.S. Publication No. 20080277127 to Dixon on Nov. 13, 2008 ("the '127 publication") teaches an improved rotary mower blade in which a carrier which is rotatably connect to a spindle driven by the mower engine, receive and holds a pair of opposed sharpened cutting segments. The cutting segments taught by the '127 publication are held in place while the carrier is rotated, and are removable and replaced as needed when the carrier is stationary.

SUMMARY OF THE INVENTION

The present invention provides a mower blade system having one or more blades, preferably two, secured to a housing such as an attachment arm that is attached to the mower. The blades provide a cutting arm that is sharpened for mowing the yard, lawn, field, or other area. A blocking body of each blade prevents the blade from passing through the housing. As the mower is running, the blocking body of each blade prevents the blade from exiting the housing due to the centripetal force.

The housing of one embodiment provides a blocking body to contact the blocking body of the blade. In another embodiment, the opening of the housing decreases in height wherein the height of the opening is less than the height of the blade. The change in height of the opening prevents the blade from passing through the housing.

The system also prevents the blade from exiting the housing through the other direction. A blocking finger may extend downward to contact the end of the blade. The blocking finger secures the end of the blade to prevent the blade from exiting the insertion side of the housing.

It is an object of the present invention to maintain the efficiency of rotary mowers.

It is an object of the present invention to decrease maintenance time of the mower system.

It is also an object of the present invention to increase efficiency of changing the blade.

It is also an object of the present invention to quickly change the sharpened sections of a rotary blade to minimize down time.

It is also an object of the present invention to secure the blade within a housing.

It is also an object of the present invention to provide a housing that allows quick release of the blade while securing the blade within the housing.

It is also an object of the present invention to simplify the process of replacing blades.

It is also an object of the present invention to maintain sharp blades on a mower to improve the overall lawn and provide a better cut.

It is also an object of the present invention to provide a low cost alternative to the requirement for additional couplers and adapters for changing a blade.

It is also an object of the present invention to eliminate the need for additional tools for changing the blades.

It is also an object of the present invention to provide a universal blade that may be secured to the mower.

It is also an object of the present invention to provide users with mower blades that can be replaced quickly, safely and in the field where necessary, thereby cutting down time and increasing efficiency at minimal cost.

These and other objects and advantages of the present invention, along with features of novelty appurtenant thereto, will appear or become apparent in the course of the following descriptive sections and the attached drawings.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is an environmental view showing one embodiment of the present invention;

FIG. 2 is a bottom perspective view of one embodiment thereof;

FIG. 3 is a bottom perspective view thereof;

FIG. 21 is a front view of an attachment arm of one embodiment of the present invention, the rear view being a mirror image of the front view;

FIG. 22 is a bottom perspective view thereof;

FIG. 29 is a front partial view of the attachment arm with locking body of one embodiment of the present invention; the rear view being a mirror image of the front view;

FIG. 30 is a bottom perspective view thereof;

FIG. 32 is a rear view of a blade of one embodiment of the present invention;

FIG. 33 is a top view thereof;

FIG. 34 is a top perspective view thereof;

FIG. 35 is a left side view thereof, the right side view being a mirror image;

DETAILED DESCRIPTION

Figure 4:
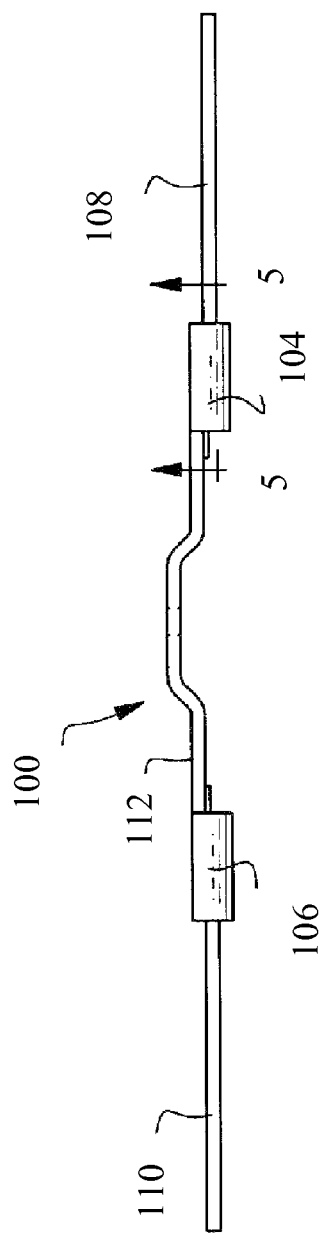
FIG. 4 is a front view thereof, the rear view being a mirror image of the front view.
Figure 5:
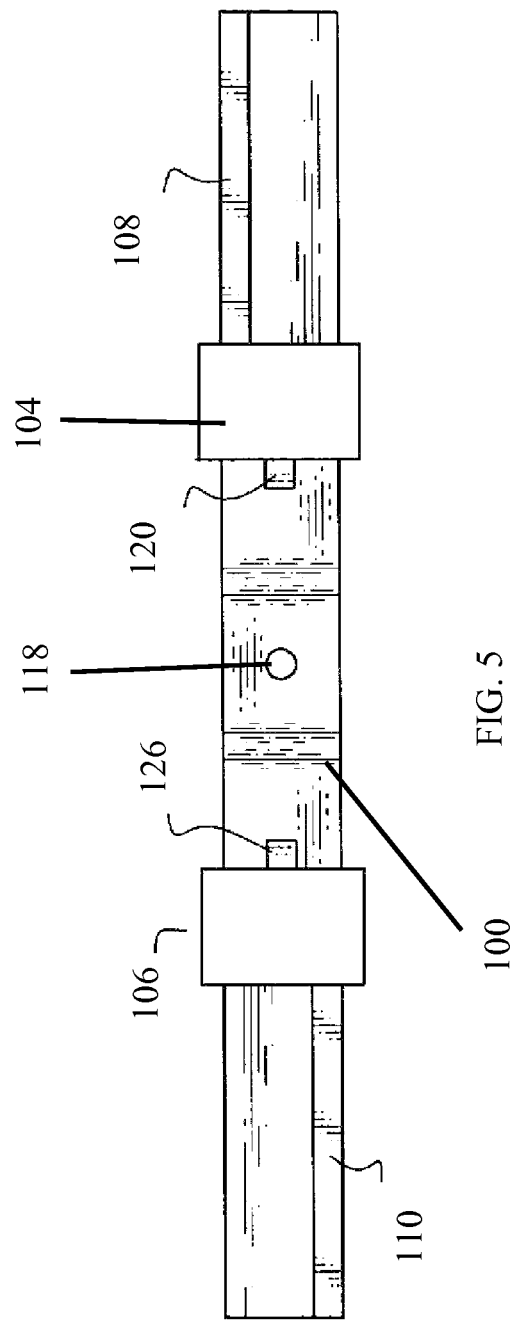
FIG. 5 is a top view thereof.

FIG. 1 shows an environmental view of one embodiment of the mower blade system 100. An attachment arm 112 secures to a spindle 116 to rotate the attachment arm 112 and blades 108, 110. The same blade works very well in a variety of commercial rotary mowers. The blades and attachment arm may be available in different sizes for attachment to different sizes and types of mowers. It is preferred that the blade and attachment arm are constructed from a metal.

Retention bodies 104, 106 located at each end of the attachment arm 112 accept blades 108, 110. Each retention body 104 provides a retention aperture within the retention body 104, 106 that allows partial passage of the blades 108, 110 through the neck 104, 106. The blades 108, 110 are inserted head first into the necks 104, 106. The blades 108, 110 increase in height around the base of the blade 108, 110. The increase in height of the blade 108, 110 at the base prevents the blade 108, 110 from completely passing through the retention bodies 104, 106.

Referring to FIG. 2, the mower blade system 100 includes an attachment arm 112. The spindle 116 attached to a motor rotates the attachment arm 112 and blades 108, 110 to cut the grass with blades 108,110. The spindle 116 is driven by the motor, either directly or indirectly, through a belt system, depending on the mower unit. An attachment aperture 118 of the attachment arm 112 receives spindle 116. A fastener 114 secures the attachment arm 112 within the deck of the mower 102 at spindle 116.

The blades 108, 110 are removably seated at the remote ends of the attachment arm 112. The blades 108, 110 are held in place along the longitudinal axis of the attachment arm 112 by the retention bodies 108, 110 at the remote ends. Each blade 108, 110 includes a sharpened edge 122, 124. The blade may be designed such that each edge of the blade has a sharpened edge 122, 124 to allow the blade to be installed in either direction. The sharpened edge 122 starts at the head of the blade 108, 110 and ends towards the base of the blade 108, 110. The blades with two sharpened edges enable the user to install the blade with either edge as a lead cutting edge. Such capability increases the life of the blade as the blade provides two sharpened edges for use instead of one.

As shown in FIGS. 2 and 3, the blades 108, 110 are inserted into retention bodies 104, 106. The height in the openings of the retention bodies 104, 106 decreases outwards from the central portion of the attachment arm 112. The blade 108, 110 increases in height toward the base such that the increased height of the blade does not allow passage of the blade through the opening in retention bodies 104, 106.

As the attachment arm 112 rotates, centrifugal forces act on the blades 108, 110. The increased height section of the blades 108, 110 located towards the base securely wedges the blades 108, 110 within the retention bodies 104, 106. The sharpened edges of the blades 108, 110 and blades 108, 110 remain securely in cutting position and cut as though the blade were a single one piece unit.

Once the blade stops rotating, the blades 108, 110 are readily removed from the attachment arm 112. The blades 108, 110 may be replaced with new blades. Because each blade provides two sharpened edges, the blades may be turned over and installed to place the opposite edge into a cutting position.

FIGS. 2-5 and 11-12 show the installation of the blades 108, 110 into the attachment arm 112. The head of the blade is inserted into an entrance of the retention body 104, 106 located on a first side of the retention body 104, 106. The blade 108, 110 exits the retention body 104, 106 at the second side of the retention body 104, 106 at the exit. The exit of the retention body 104, 106 is located outward from the entrance of the retention body 104, 106. After the blade 108, 110 is installed into the retention body 104, 106, a locking finger 120, 126 secures the base of the blades 108, 110 within the retention body 104, 106. The locking finger 120, 126 prevents the removal of blades 108, 110 from the retention body 104, 106. The locking finger 120, 126 will be described in greater detail below with regards to FIGS. 8 and 9. The height of the opening in the retention bodies decreases from the entrance of the opening to the exit of the opening.

Figure 6:
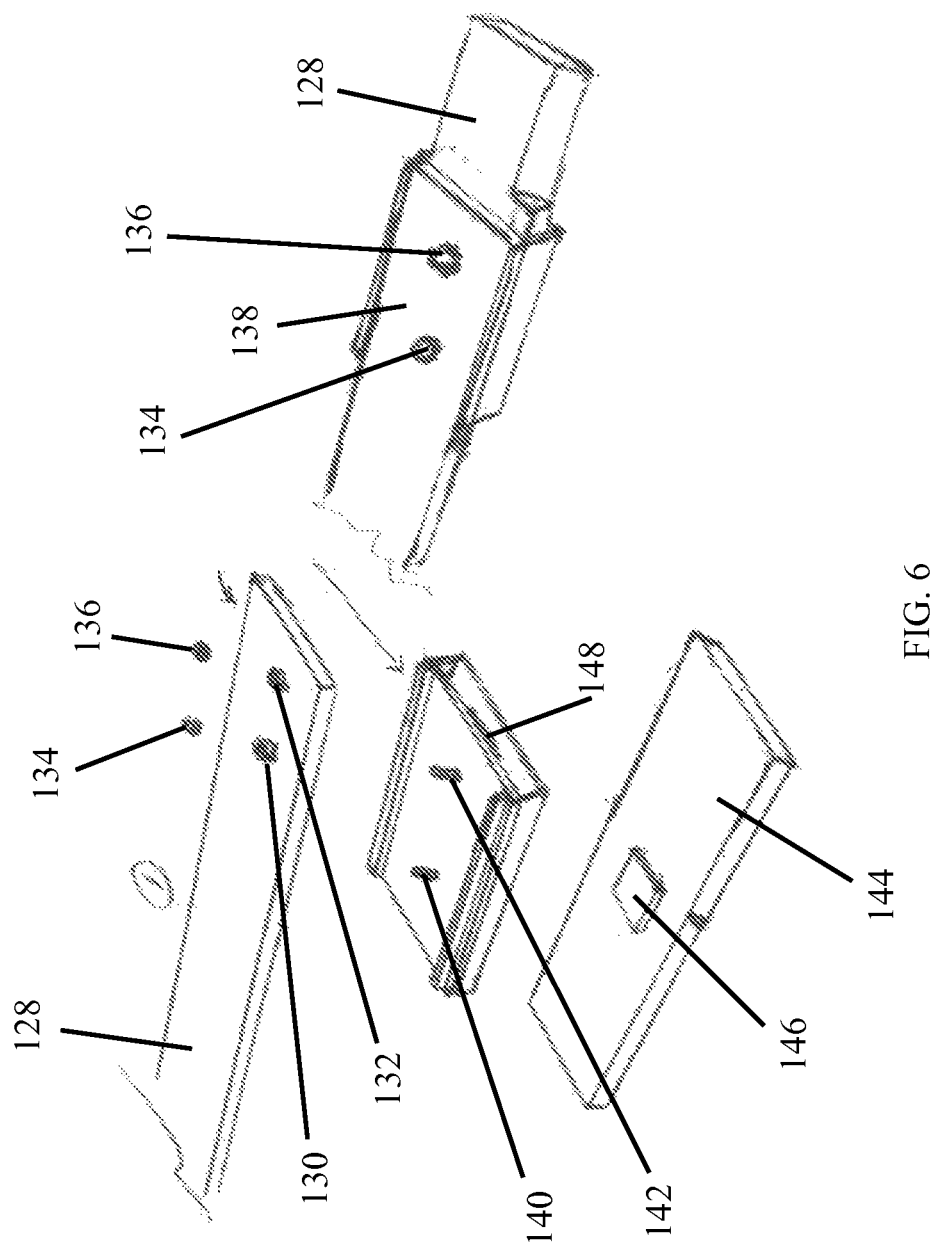
FIG. 6 is a top perspective view of one embodiment of the present invention.

FIG. 6 shows another embodiment of the blade 128 and retention body 138. The blade 128 provides attachment apertures 130, 132 that accept a fastener to secure the blade within the retention body 138. Attachment apertures 140, 142 of retention body 138 also accept the fastener placed through attachment apertures 130, 132. Nuts 134, 136 secure the blade 128 within the retention body 138.

FIG. 6 also shows another embodiment with a blocking body 146. The blocking body 146 increases the height of the blade 144 to prevent the blade from passing completely through the retention body. The blocking body 146 increases the height of the blade such that the blade cannot completely pass through the retention body.

Figure 7:
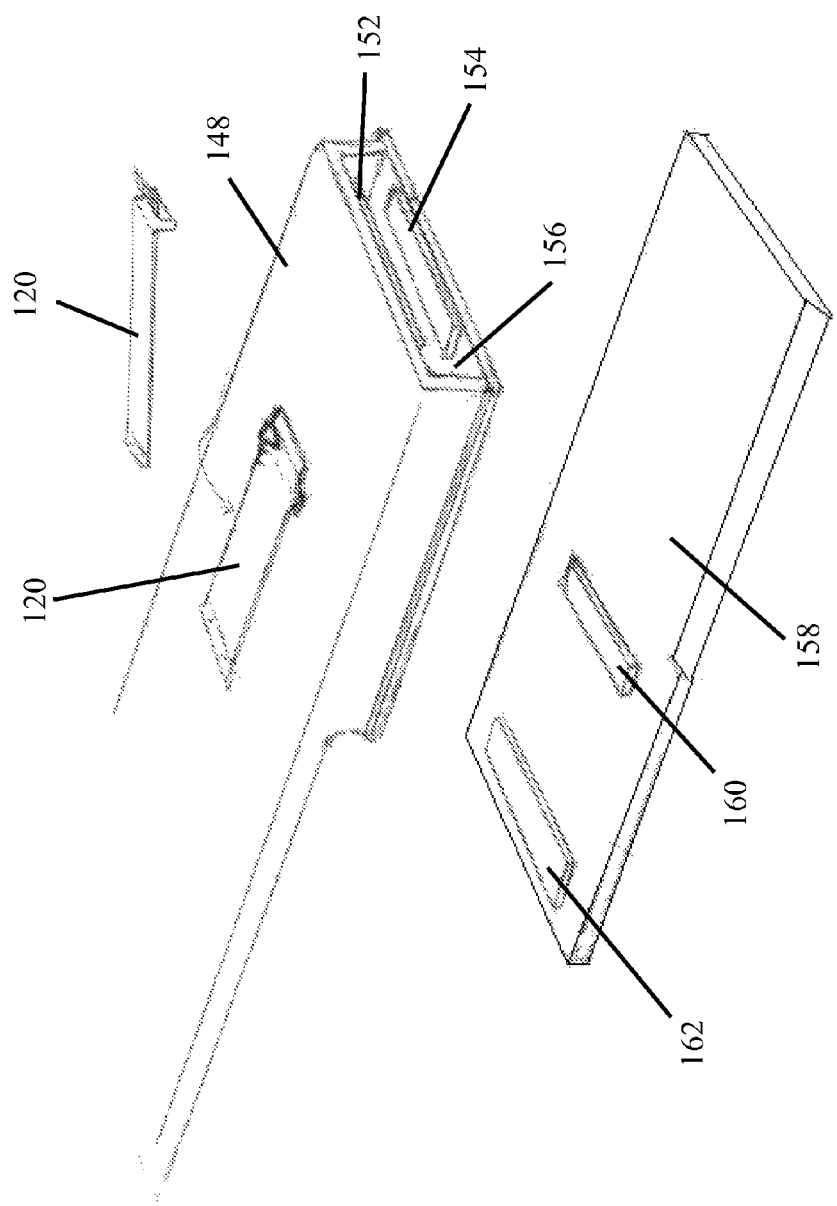
FIG. 7 is a partial top perspective view thereof.

FIG. 7 shows another embodiment of the blade 158 and retention body 148. Blade 158 provides two blocking bodies 160, 162. The blocking bodies contact blocking bodies 152, 154 secured to the retention body 148 within opening 156. The blocking bodies will be described in greater detail below.

Figure 9:
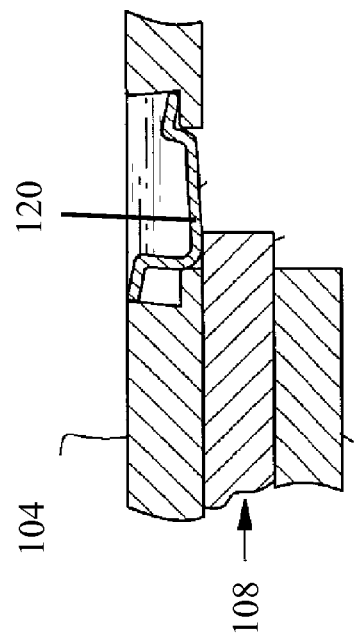
FIG. 9 is a sectional view thereof.
Figure 8:
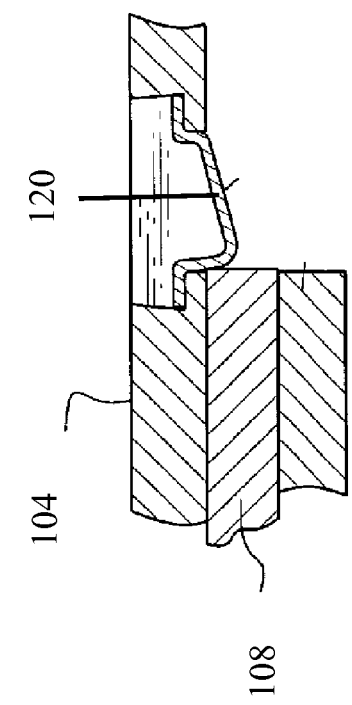
FIG. 8 is a sectional view of one embodiment of the present invention.

FIGS. 7-9 provide additional information concerning locking fingers 120, 126. Locking fingers 120, 126 are biased in a downward direction. As the blade 108 is installed into retention body 104, the locking finger 120 is biased downwards to contact the base of blade 108. The contact of the locking finger 120 blocks the blade 108 from movement in the reverse direction. Therefore, locking finger 120 prevents removal of the blade 108 from the retention body 104.

To remove the blade 108, the user must depress locking finger 120. The locking finger 120 moves upward to unblock the blade 108 and allow removal of the blade 108 from the retention body 104. In one embodiment, the locking finger is constructed from spring steel. The locking finger is biased by a spring or other biasing mechanism. The locking finger 120 is positioned on the attachment arm 112 so as to abut the blades 108, 110 when the blades 108, 110 are in the cutting position. The locking finger 120, 126 inhibits the movement of blades 108, 110 from the secured position until the locking finger 120, 126 is manually depressed.

Figure 10:
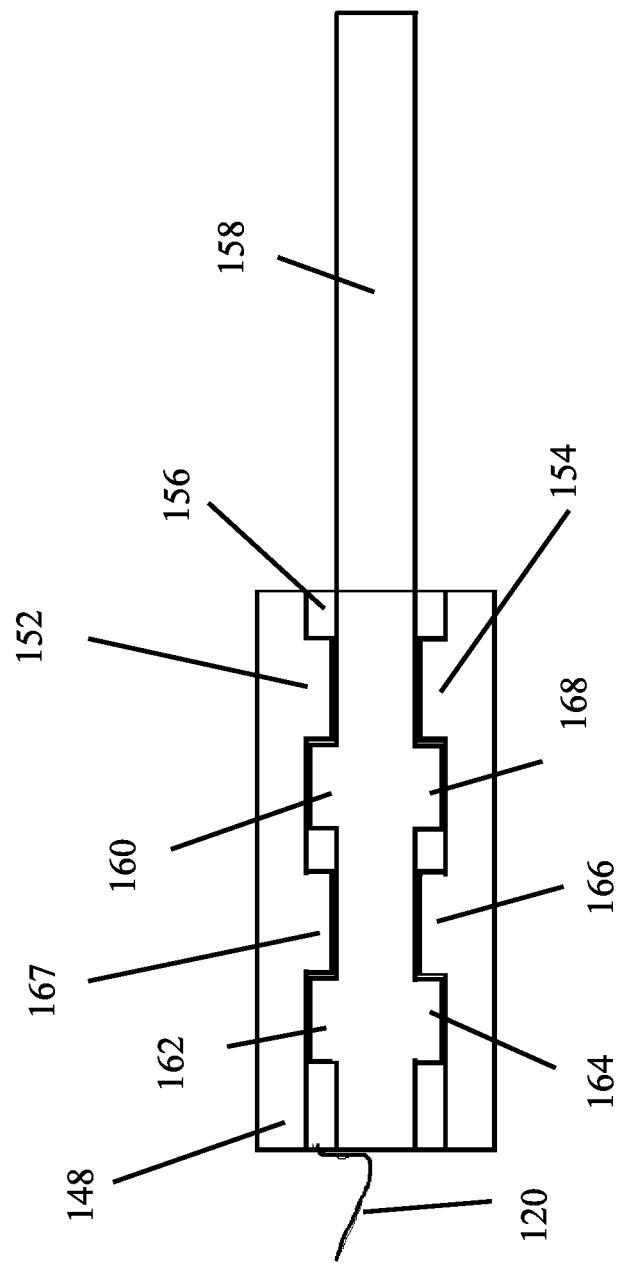
FIG. 10 is a sectional view thereof.
Figure 12:
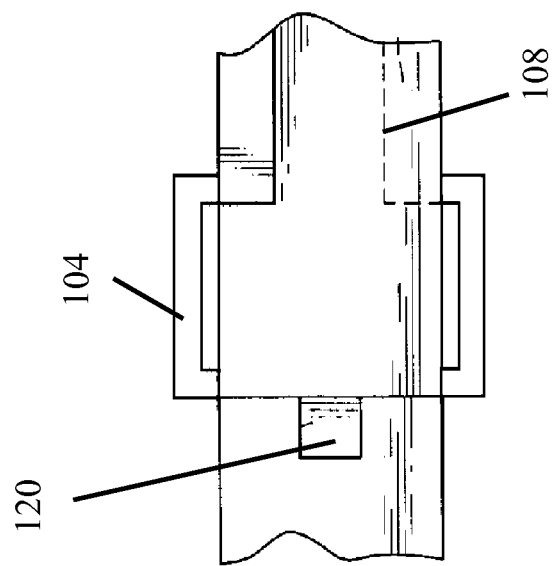
FIG. 12 is a sectional view thereof.
Figure 11:
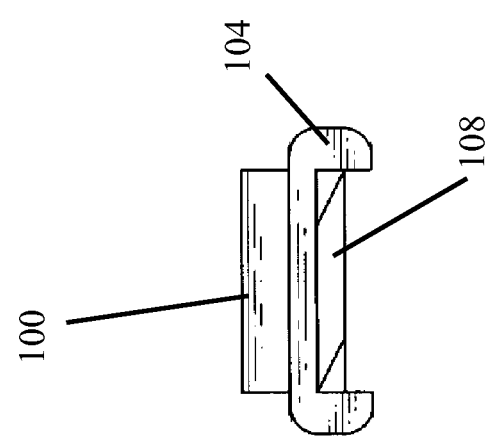
FIG. 11 is a right side view thereof, the left side view being a mirror image of the right side view.
Figure 13:
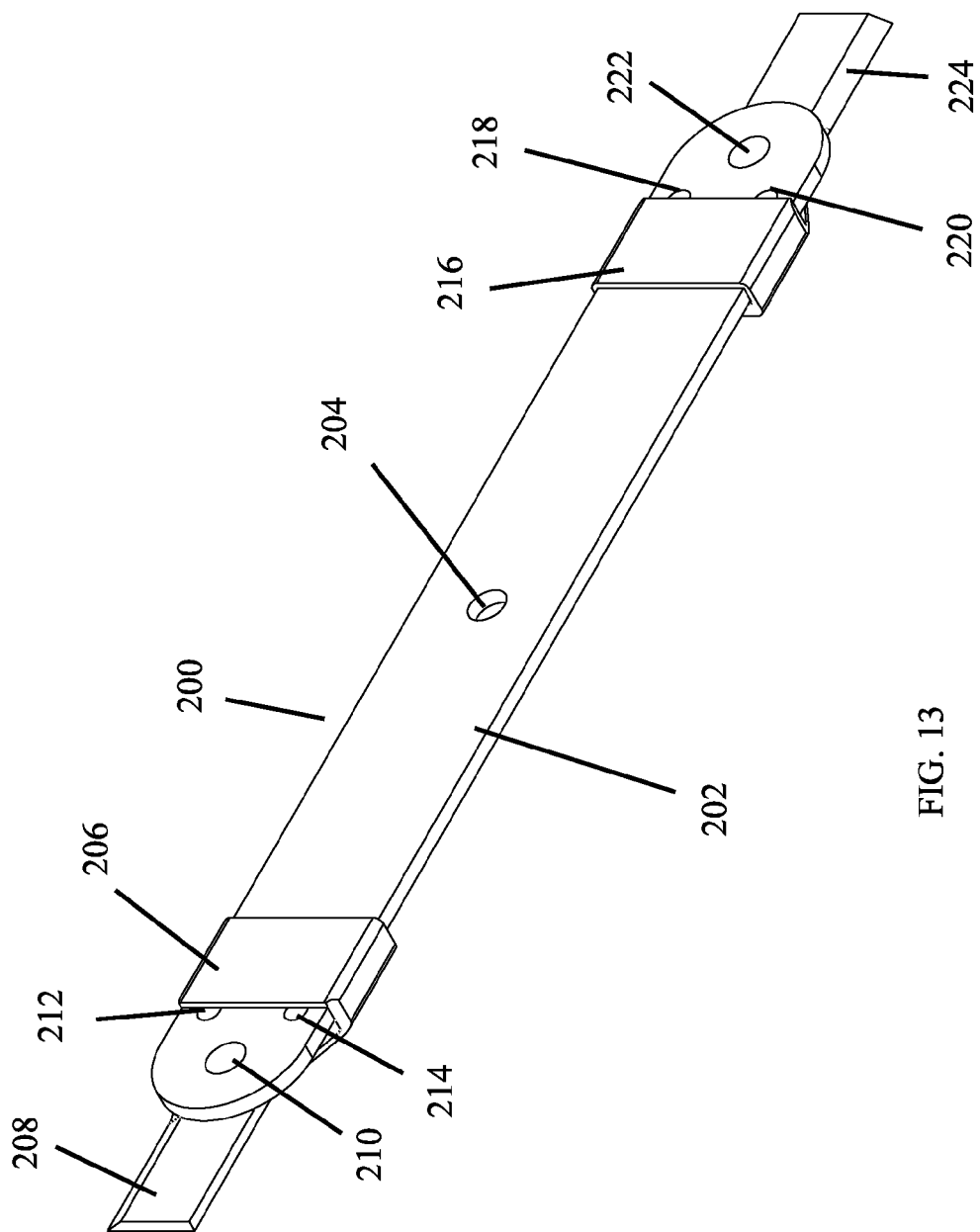
FIG. 13 is a top perspective view of one embodiment of the present invention.
Figure 14:
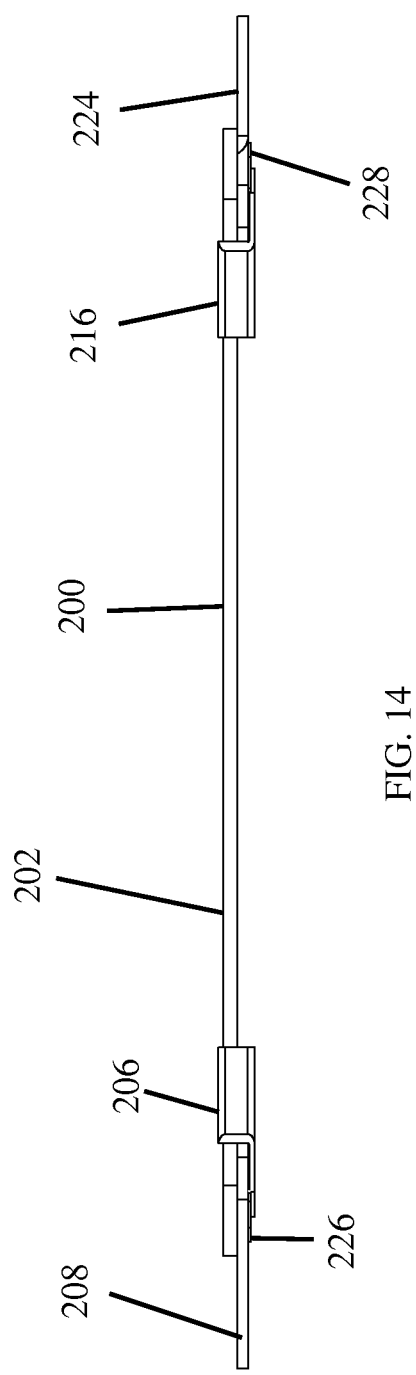
FIG. 14 is a front view thereof; the rear view being a mirror image of the front view.
Figure 15:
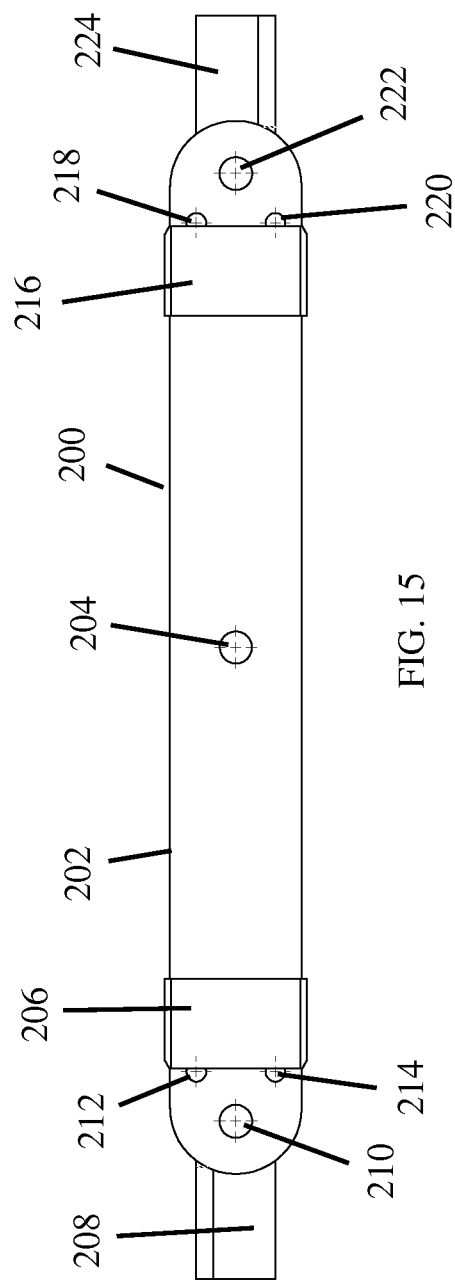
FIG. 15 is a top view thereof.
Figure 16:
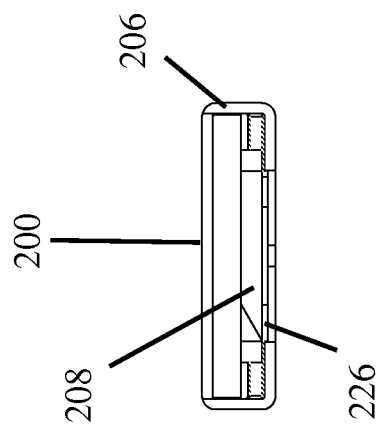
FIG. 16 is a left side view thereof, the right side view being a mirror image of the left side view.

FIG. 10 shows a sectional view of the blade 158 secured within retention body 148. The blade 158 provides multiple blocking bodies 160, 162, 164, 168. The blocking bodies extend from both the top and the bottom of the blade 108. The blade may be constructed with one or multiple blocking bodies 160, 162, 164, 168. Similarly, the retention body 148 provides blocking bodies 152, 154, 166, 167. The blocking bodies 152, 154, 166, 167 are located within opening 156. Blocking bodies 152, 167 extend downward from the upper wall of the retention body 148. Blocking bodies 154, 166 extend upward from the lower wall of the retention body 148.

The blade 158 is inserted into the opening 156 until blocking bodies 160, 162, 164, and 168 of blade 158 contact blocking bodies 152, 154, 166, 167 of retention body 148. The blades 158 extend outward from the attachment arm 112 to allow the cutting of the lawn. Locking finger 120 adjusts downward to lock the blade into position due to the bias on the locking finger 120.

FIGS. 13-16 show another embodiment of the present invention. The mower blade system generally shown as 200 provides an attachment arm 202 that attaches to the lawnmower. Attachment aperture 204 enables the attachment arm to attach to the lawnmower at the spindle. The attachment aperture 204 enables the attachment arm 202 to attach to lawnmowers without reconfiguring the lawnmower. The attachment arm 202 attaches to the lawnmower in a similar manner as existing lawnmower blades. The blade system 200 retrofits with existing lawnmowers.

Retention bodies 206, 216 provide a retention aperture through which the attachment arm 202 passes through. The retention bodies 206, 216 slide longitudinally on the attachment arm 202 for securing the blades 208, 224 to attachment arm 202. Retention bodies 206, 216 adjust towards the ends of attachment arm 202 to lock the blades 208, 224 into position. The retention fingers of retention bodies 206, 216 at least partially obstruct locking bodies 226, 228 to reduce movement of the locking bodies 226, 228.

The blades 208, 224 are installed onto pivot fingers 210, 222. The retention bodies 206, 216 adjust longitudinally towards the center of attachment arm 202 to provide access to the pivot fingers 210, 222. The user vertically moves the locking finger 234 of locking bodies 226, 228 to create space for installation of the blades 208, 224 onto attachment arm 202. The blades 208, 224 are then placed on the pivot fingers 210, 222 between the attachment arm 202 and the locking bodies 226, 228. Retention bodies 206, 216 are then adjusted longitudinally towards the ends of attachment arm 202. The retention bodies 206, 216 at least partially cover the locking bodies 226, 228 to limit movement of the locking bodies 226, 228. More specifically, the retention bodes 206, 216 limit movement of the locking bodies 226, 228 away from the attachment arm 202. The retention bodies 206, 216 maintain the positioning of the locking bodies 226, 228 to secure the blades 208, 224 on the pivot fingers 210, 222. The blocking fingers 212, 214, 218, 220 limit movement of the blades 208, 224 as will be discussed below.

Figure 17:
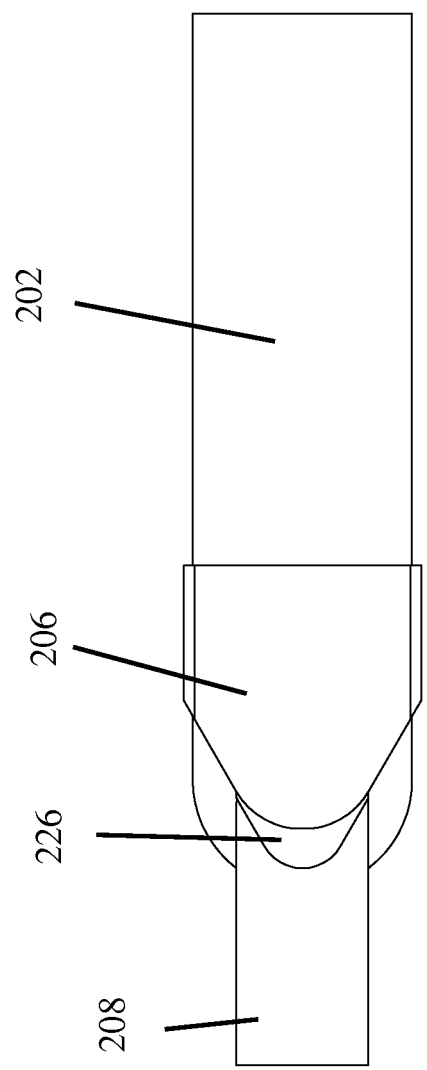
FIG. 17 is a partial bottom view thereof.
Figure 18:
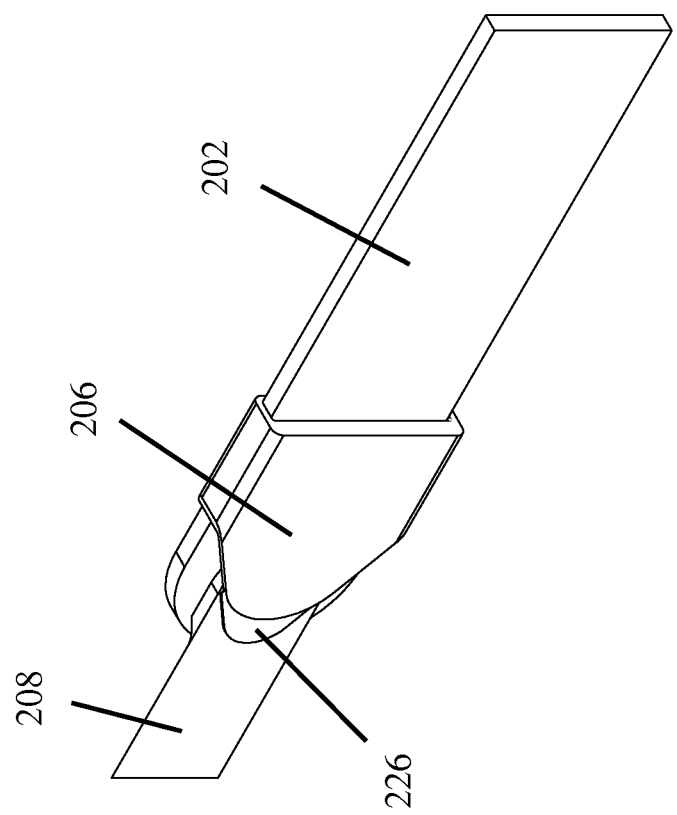
FIG. 18 is a partial bottom perspective view thereof.

FIGS. 17-18 show the positioning of the retention body 206 in relation to locking body 226. Retention body 206 functions similarly to retention body 218 but on the other end of attachment arm 202. Retention bodies 206, 218 adjust towards the ends of attachment arm 202 to at least partially cover locking bodies 226, 228 to secure the blades 208, 224 between locking bodies 226, 228 and attachment arm 202. The centripetal force caused by the rotation of attachment arm 202 on the lawnmower forces retention bodies 206, 218 towards the ends of attachment arm 202 The centripetal force maintains the retention bodies 206, 216 in the locked position to secure the blades 208, 224 on attachment arm 202.

Figure 19:
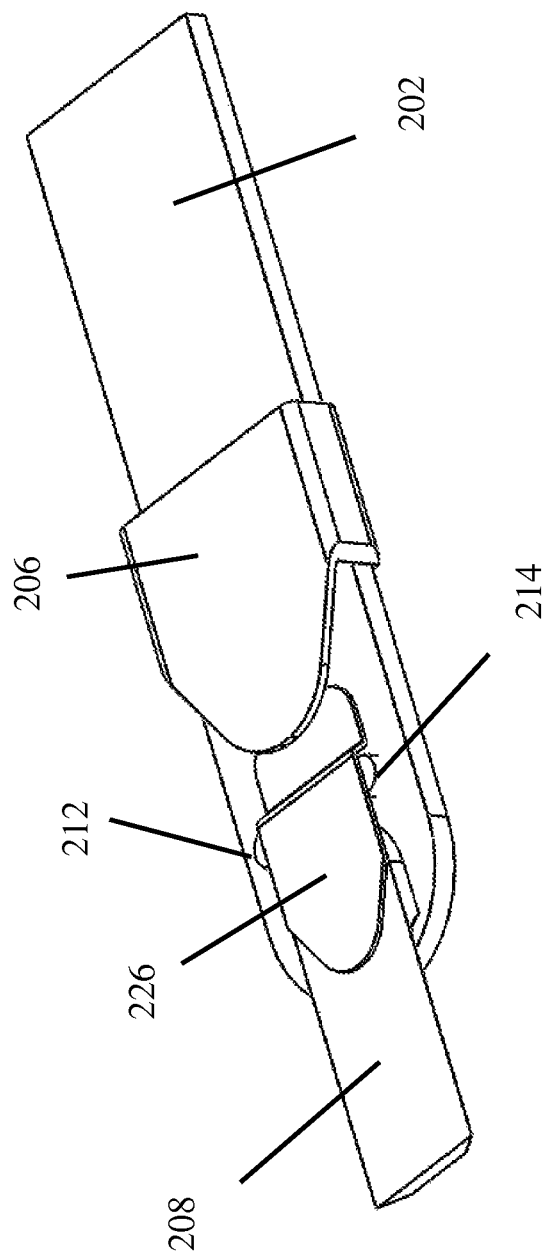
FIG. 19 is a partial bottom perspective view thereof.
Figure 20:
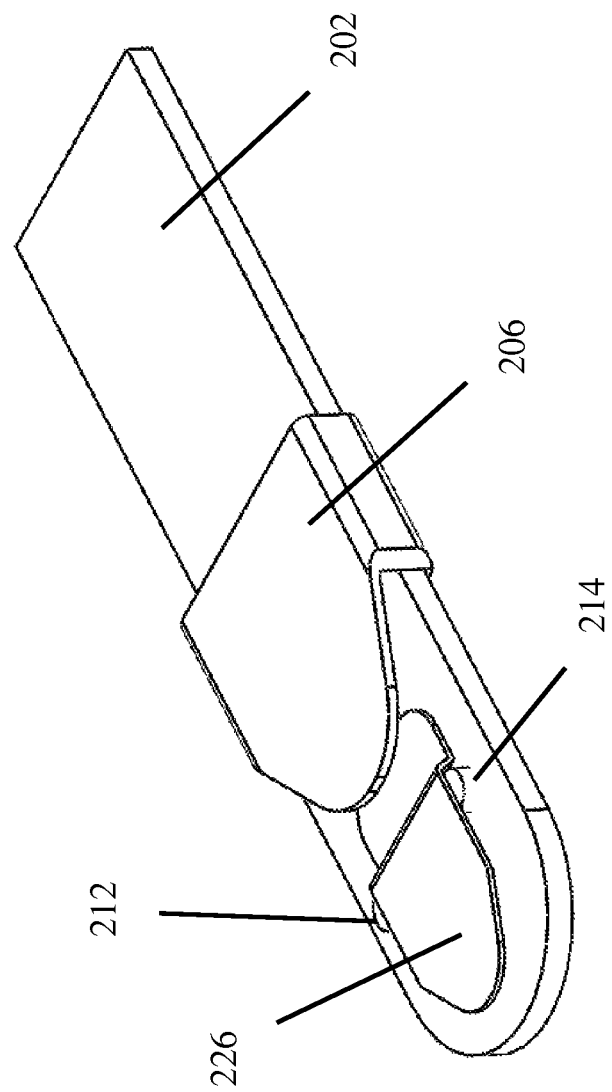
FIG. 20 is a partial bottom perspective view thereof.
Figure 23:
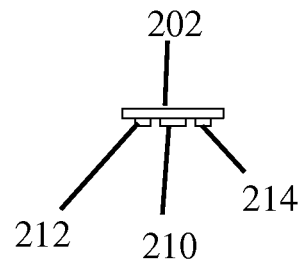
FIG. 23 is a left side view thereof; the right side view being a mirror image of the left side view.
Figure 24:
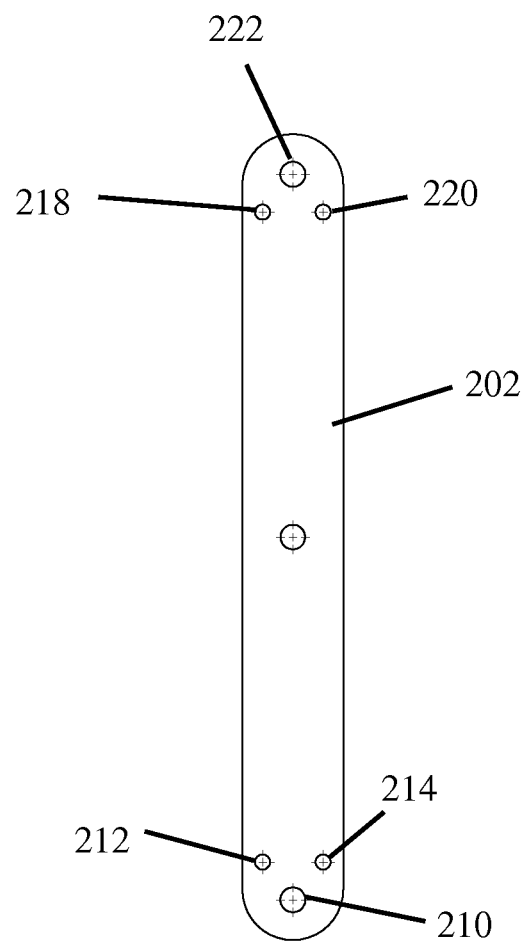
FIG. 24 is a bottom view thereof.
Figure 26:
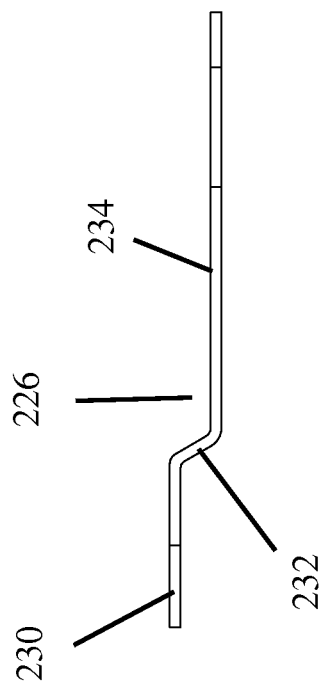
FIG. 26 is a left side view thereof; the right side view being a mirror image of the left side view.
Figure 25:
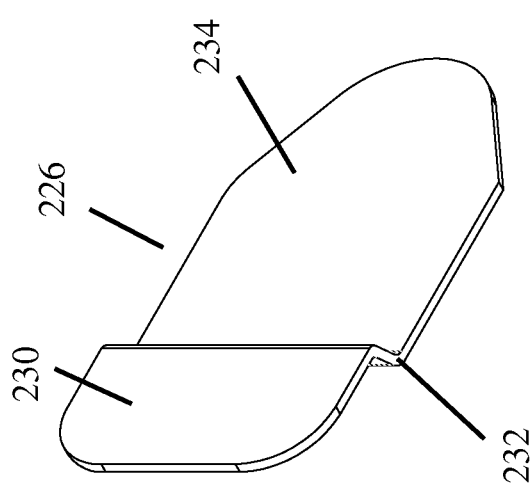
FIG. 25 is a top perspective view of a locking body of one embodiment of the present invention.
Figure 27:
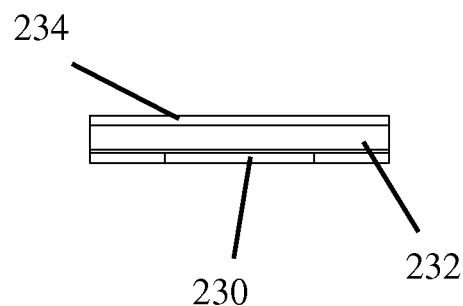
FIG. 27 is a rear view thereof.
Figure 28:
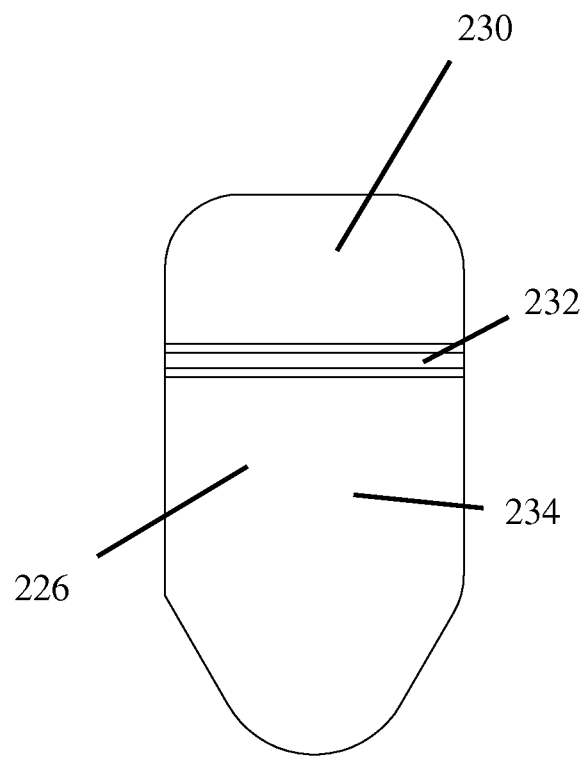
FIG. 28 is a top view thereof.

FIG. 18 shows the retention bodies 206, 216 adjusted to the locked position. FIGS. 19 and 20 show the retention bodies 206, 216 adjusted to the unlocked position that allows movement of the locking bodies 226, 228. Retention bodies 206, 216 slide towards the center of attachment arm 202 away from the blades 208, 224, locking bodies 226, 228, and pivot fingers 210, 222 to adjust to the unlocked position. Once positioned in the unlocked position, retention bodies 206, 216 allow adjustment of locking bodies 226, 228. The user may then access pivot finger 210, 222 to either install or remove blades 208, 224. The user may then place the pivot aperture of the blades 208, 224 on the pivot finger 210, 222 for installation of the blade 208, 224. The locking bodies 226, 228 of one embodiment are located on the bottom of attachment arm 202 for securing the blades 208, 224 to the bottom of attachment arm 202. In another embodiment, locking bodies 226, 228 are located on the top of attachment arm 202 for securing the blades 208, 224 to the top of attachment arm 202.

FIGS. 21-24 show the attachment arm 202. The attachment arm 202 provides attachment aperture 204 for securing the attachment arm 202 to the lawnmower. Pivot fingers 210, 222 extend vertically from the attachment arm for securing the blades 208, 224 to the attachment arm 202. In one embodiment, the pivot fingers 210, 222 extend vertically downward from attachment arm 202 for securing the blades 208, 224 to the bottom of the attachment arm 202. In another embodiment, the pivot fingers 210, 222 extend vertically upward to secure the blades to the top of the attachment arm.

Attachment arm 202 also provides multiple blocking fingers 212, 214, 218, 220 that extend vertically in the same direction as the pivot fingers 210, 220. The blocking fingers 212, 214, 218, 220 are located longitudinally more towards the center of attachment arm 202 than the pivot fingers 210, 220. Blocking fingers 212, 214, 218, 220 are also located laterally to the sides of pivot fingers 210, 220.

Blocking fingers 212, 214, 218, 220 prevent the blades 208, 224 from spinning around on the attachment arm 202. The blocking fingers 212, 216, 218, 220 contact the blade to limit movement of the blades 208, 224 if the blades should hit an object such as a rock or stump.

Figure 31:
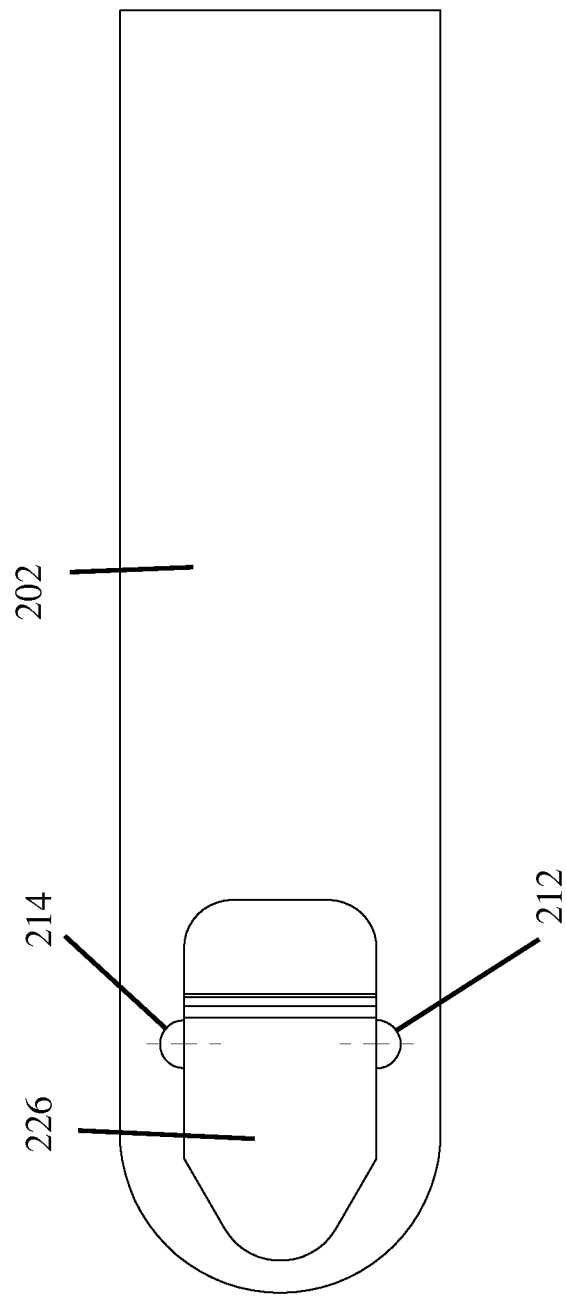
FIG. 31 is a bottom view thereof.
Figure 32A:
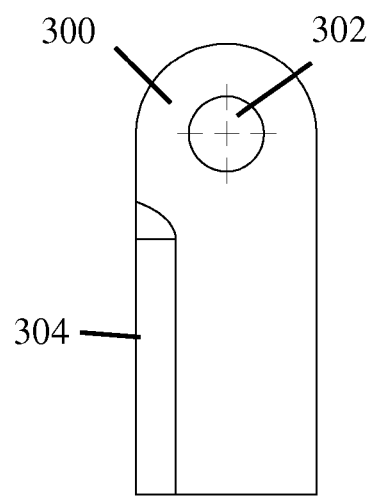
FIG. 32A is a top view of a blade of one embodiment of the present invention.
Figure 33A:
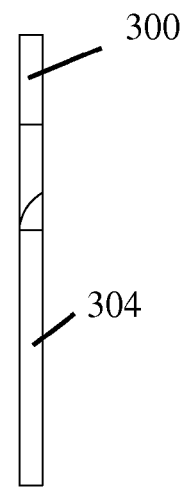
FIG. 33A is a left side view thereof, the right side view being a mirror image of the left side view.
Figure 34A:
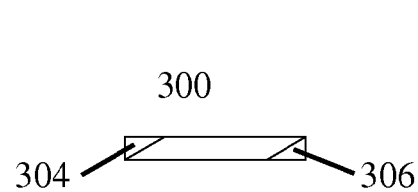
FIG. 34A is a front view thereof.
Figure 35A:
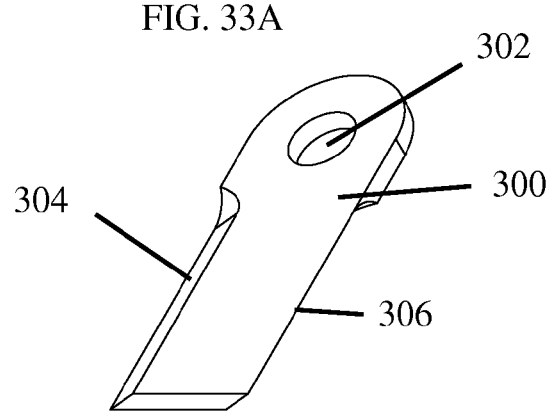
FIG. 35A is a top perspective view thereof.
Figure 37:
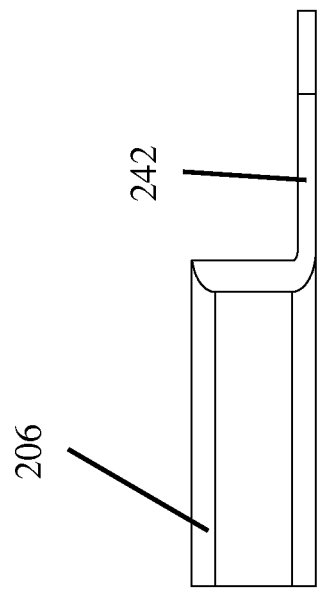
FIG. 37 is a left side view thereof, the right side view being a mirror image of the left side view.
Figure 36:
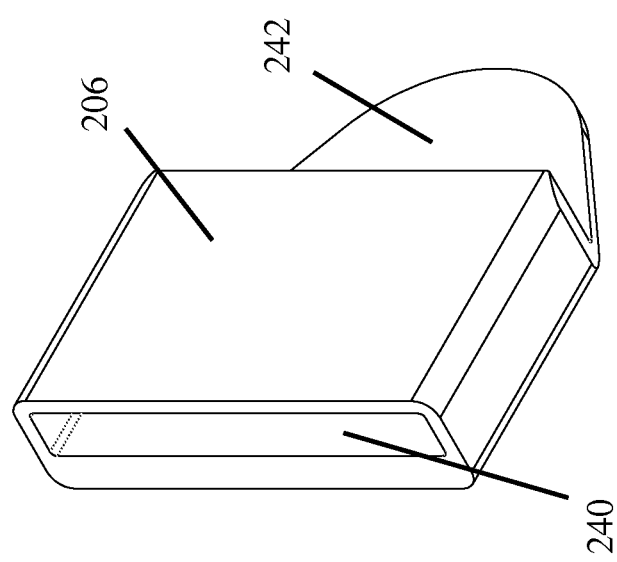
FIG. 36 is a top perspective view of a retention body of one embodiment of the present invention.

FIGS. 25-28 show the locking bodies 226, 228. Locking bodies 226, 228 provide a base 230 for attachment to the attachment arm 202. Locking finger 234 extends longitudinally from the base 230. Locking neck 232 extends vertically from the base 230 to provide for clearance of the pivot fingers 210, 222 and blocking fingers 212, 214, 218, 220 between the locking finger 234 and the attachment arm 202 as shown in FIGS. 29-31.

Base 230 of locking bodies 226, 228 secures to attachment arm 202. Locking bodies 226, 228 serve as a spring that limits clearance between the pivot fingers 210, 222 and the locking bodies 206, 216. In one embodiment, the locking bodies 226, 228 are constructed from spring steel.

FIGS. 32-35 show one embodiment of the blade 208. The blade 208 provides a pivot aperture 236 for securing the blade 208 within the space between attachment arm 202 and locking body 226, 228. Pivot fingers 210, 222 fit into pivot apertures 236 of blades 208, 224 for securing the blades 208, 224 to the attachment arm 202. The pivot aperture 236 is sized large enough to accept the pivot finger 210, 222. In one embodiment, the pivot aperture 236 is larger than pivot finger 210, 222 to allow blade 208, 224 to pivot on the pivot finger 210, 222. Enabling the blade to pivot reduces the possibility of breaking the blade should the blade strike a rock, tree stump, stick, or other object. As discussed above, blocking fingers 212, 214, 218, 220 prevent the blade 208, 224 from spinning complete around on the pivot fingers 210, 222.

The blade 208, 224 provides a sharpened edge 238 for cutting the grass, weeds, lawn, etc. In one embodiment, the blade 208, 224 may provide a single edge. In another embodiment, the blade 208, 224 may provide two sharpened edges. The user can remove the blade, flip the blade, and reattach the blade to pivot finger 210, 222. The user can then continue mowing with a sharpened blade due to the other edge being sharp. In one embodiment, the edges are sharpened so that the cutting edge will remain the same once the blade is flipped over and reattached.

FIGS. 32A-35A show another embodiment of the blade 300. Similar to blade 208, blade 300 provides a pivot aperture 302 for installation of blade 300 on the pivot fingers 210, 222 as discussed above. Blade 300 provides a first sharpened edge 304 and a second sharpened edge 306. The sharpened edges 304, 306 provide two cutting surfaces. As one edge becomes dull, the user may remove blade 300 from pivot finger 210, 222. The user adjusts the retention body to the unlocked position by moving the retention body away from pivot finger 210, 222. The user then vertically displaces the locking body 226, 228 and removes the blade 300 from pivot finger 210, 222. The user can then turn the blade 300 over to provide a second sharpened edge. The user then vertically displaces the locking body 226, 228 and reinstalls the blade 300 onto pivot finger 210, 222. The user can then adjust the retention body to the locked position by moving the retention body towards the pivot finger.

FIGS. 36-40 show the retention body 206 that is attached to the attachment arm 202. The retention body 206 adjusts along the longitudinal axis of the attachment arm 202 for securing and releasing the blades 208, 224 from pivot fingers 210, 222. A retention body 206, 216 secures each blade 208, 224. Retention finger 242 extends longitudinally across the locking body 226 as shown in FIGS. 17 and 18.

Figure 38:
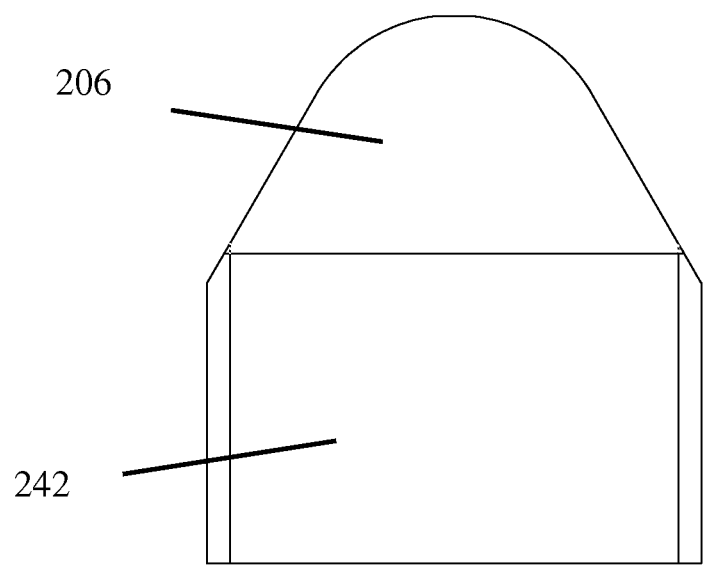
FIG. 38 is a top view thereof.
Figure 39:
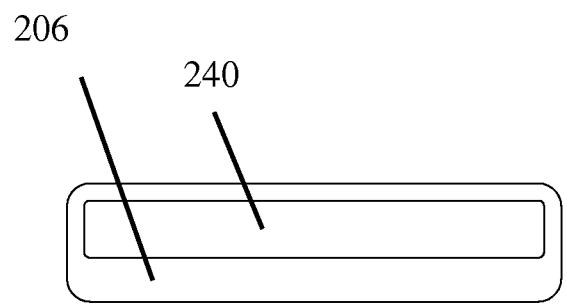
FIG. 39 is a rear view thereof.
Figure 40:
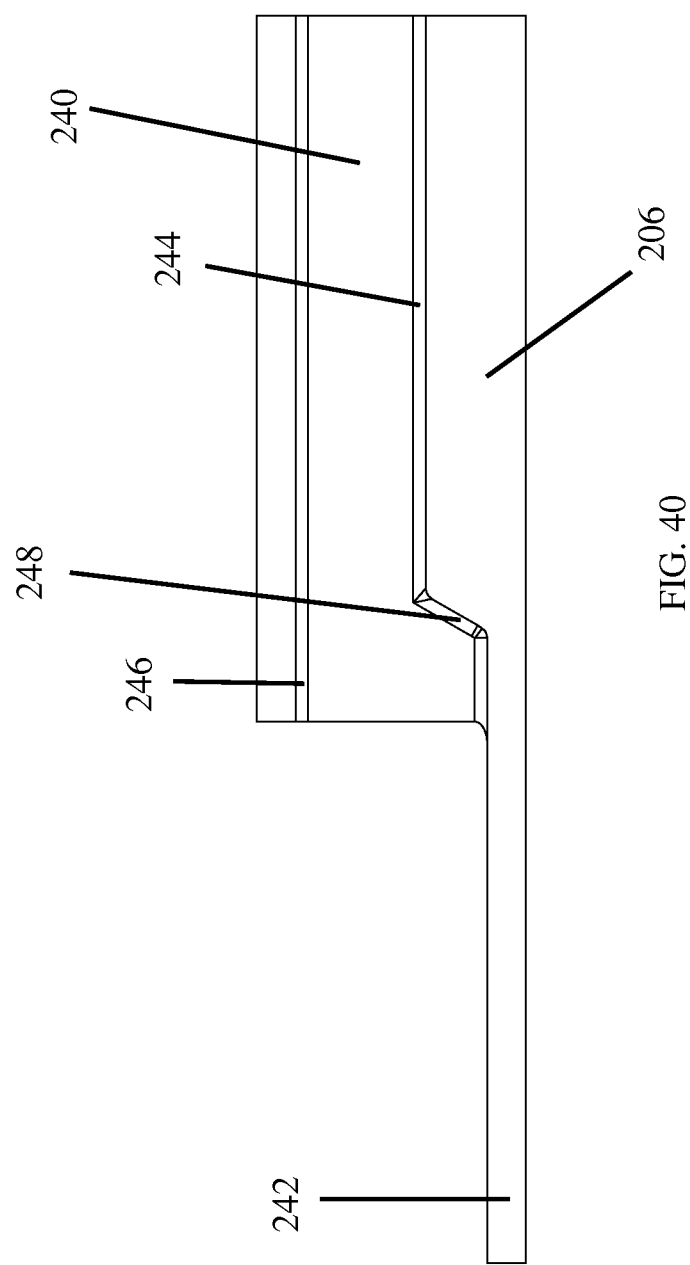
FIG. 40 is a sectional view thereof.

Retention aperture 240 extends longitudinally through the retention body 206. The attachment arm 202 inserts longitudinally into retention body 206 as shown in FIGS. 38 and 40. The retention aperture provides an interior floor 244 and ceiling 246 within retention aperture 240. The height of the aperture varies in order to secure the locking bodies 226, 228. The height of retention aperture 240 decreases along the longitudinal axis of retention aperture 240. The height of retention aperture 240 towards the blades 208, 224 is greater than the height of the retention aperture 240 away from the blades 208, 224. The height of retention aperture 240 decreases at incline 248 along the longitudinal axis towards the center of the attachment arm 202. The incline 248 of the retention bodies 206, 216 prevents blades 208, 224 and locking bodies 226, 228 when attached to the attachment arm 202 from passing completely through retention aperture 240. Such attachment secures both the retention bodies 206, 216 and the blades 208, 224 on attachment arm 202.

Figure 42:
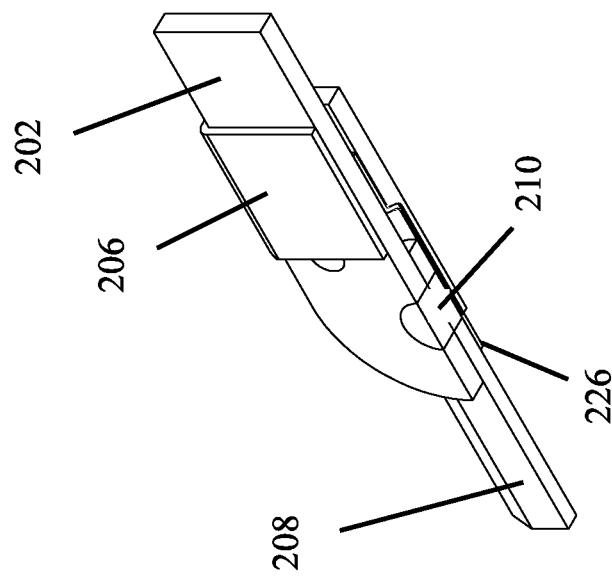
FIG. 42 is a sectional view thereof.
Figure 41:
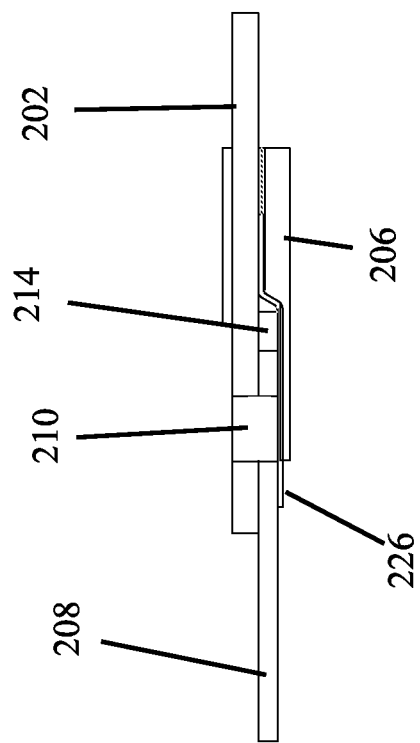
FIG. 41 is a sectional view of one embodiment of the present invention.

FIGS. 41-42 show the retention bodies 206, 216 securing the locking bodies 226, 228 and blades 208, 224. Pivot fingers 210, 222 extend vertically into the pivot aperture 236 of blades 208, 224. Locking bodies 226, 228 abut the pivot fingers 210, 222 to reduce the possibility of the blades 208, 224 from shaking loose from attachment arm 202. Retention body 206, 216 extends longitudinally to the pivot finger 210, 222 to further secure the blades 208, 224.

The present invention may provide different sized blades dependent on the size of the mower. The blades may be sized for mowers that mow with blades of 16 inches, 18 inches, 19 inches, 20 inches, 21 inches, 22 inches, 30 inches, 33 inches, 38 inches, 42 inches, 46 inches, 48 inches, 50 inches, 54 inches, 60 inches, and other blade sizes. Because the mower system of one embodiment is constructed with two separate blades instead of a single blade, the size of each blade of the present invention may be shortened to provide the designated mowing area. Each of the different sized blades may be designed to fit within an attachment arm. The attachment arm may be universally sized such that the different sized blades may be secured within the attachment arm.

In one embodiment, the size and shape of the attachment arm may vary to fit within different mowers. The shape may also be varied to securely attach to the mower.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A rotary mower blade system attachable to a spindle of a lawnmower, the system comprising:
   an attachment arm extending along a longitudinal axis;
   an attachment aperture providing access through the attachment arm along a vertical axis, the spindle passing vertically through the attachment aperture of the attachment arm to secure the attachment arm to the lawnmower;
   a first retention body attachable to the attachment arm;
   a retention aperture of the retention body extending on the longitudinal axis, wherein at least a portion of the attachment arm passes through the retention aperture of the retention body;
   a vertical height of the retention aperture that decreases along the longitudinal axis to limit movement of the retention body along the longitudinal axis of the attachment arm; and
   a blade that inserts into the retention aperture of the retention body to secure the blade to the attachment arm, wherein both the blade and the attachment arm are secured within the retention aperture.

2. The system of claim 1 further comprising:
   a pivot finger extending vertically from the attachment arm, the pivot finger contacting the blade to secure the blade to the attachment arm.

3. The system of claim 2 further comprising:
   a locking body secured to the attachment arm;
   a locking finger of the locking body that is vertically displaced from the attachment arm, the locking finger extending longitudinally across the pivot finger such that the pivot finger is located between the attachment arm and the locking finger.

4. The system of claim 3 wherein the locking body is constructed from spring steel.

5. The system of claim 3, the blade further comprising:
   a pivot aperture of the blade wherein the pivot finger passes vertically through the pivot aperture of the blade;
   the blade secured between the attachment arm and the locking finger wherein the pivot finger passes through the pivot aperture of the blade to secure the blade to the attachment arm, the locking finger contacting the blade to secure the blade to the attachment arm.

6. The system of claim 5 wherein the vertical height of the retention aperture is greater towards the blade than the center of the attachment arm.

7. The system of claim 6 wherein at least a portion of the locking finger, the blade, and the attachment arm are located within the retention aperture, wherein the retention body encompasses at least a portion of the attachment arm, the blade, and the locking body.

8. The system of claim 2, the blade further comprising:
   a pivot aperture of the blade, wherein the pivot finger passes vertically through the pivot aperture of the blade.

9. The system of claim 2 further comprising:
   a locking finger secured to the attachment arm, the locking finger vertically displaced from the attachment arm, the locking finger extending longitudinally across the pivot finger such that the pivot finger is located between the attachment arm and the locking finger;
   a pivot aperture of the blade wherein the pivot finger inserts into the pivot aperture;
   the locking finger passing across the pivot finger and the blade when the pivot finger is inserted into the blade aperture wherein the blade and pivot finger are located between the locking finger and the attachment arm, the locking finger biased towards the attachment arm to secure the blade onto the pivot finger.

10. The system of claim 1 further comprising:
    an outer surface of the blade wherein the outer surface is curved.

11. The system of claim 1 further comprising:
    a first cutting edge of the blade;
    a second cutting edge of the blade wherein the first cutting edge and the second cutting edge are located on opposite sides of the blade.

12. A rotary mower blade system attachable to a spindle of a lawnmower, the system comprising:
    an attachment arm extending along a longitudinal axis;
    an attachment aperture providing access vertically through the attachment arm, the spindle passing vertically through the attachment arm to secure the attachment arm to the lawnmower;
    a first retention body attachable to the attachment arm;
    a second retention body attachable to the attachment arm;
    a retention aperture of the retention bodies extending on the longitudinal axis, wherein at least a portion of the attachment arm passes through the retention aperture of the retention bodies, wherein the retention aperture enables the retention bodies to move along the longitudinal axis of the attachment arm;
    a first blade that inserts into the retention aperture of the first retention body to secure the first blade to the attachment arm, wherein both the first blade and the attachment arm are secured within the retention aperture;
    a second blade that inserts into the retention aperture of the second retention body to secure the second blade to the attachment arm, wherein both the second blade and the attachment arm are secured within the retention aperture;
    a first pivot finger extending vertically from the attachment arm, the first pivot finger contacting the first blade to secure the first blade to the attachment arm;
    a second pivot finger extending vertically from the attachment arm, the second pivot finger contacting the second blade to secure the second blade to the attachment arm;
    a locking body secured to the attachment arm;
    a locking finger of the locking body that is vertically displaced from the attachment arm, the locking finger extending longitudinally across the first pivot finger such that the first pivot finger is located between the attachment arm and the locking finger.

13. The system of claim 12, the blade further comprising:
a pivot aperture of the first blade, wherein the pivot finger passes vertically through the first blade;
the first blade secured between the attachment arm and the locking finger, wherein the pivot finger passes through the pivot aperture of the first blade to secure the first blade to the attachment arm, the locking finger biased towards the attachment arm to contact the pivot finger to pivotally secure the first blade.

14. The system of claim 13 further comprising:
a first end of the retention aperture having a first vertical height;
a second end of the retention aperture having a second vertical height that is greater than the first vertical height, wherein the first end and the second end are longitudinally spaced apart, the first end located towards the center of the attachment arm, wherein the blade and the locking body when attached to the attachment arm can pass into the second end and the first vertical height of the first end limits the blade and the locking body from passing through the first end;
the retention body encompassing at least a portion of the attachment arm, the blade, and the locking finger to secure the first blade to the attachment arm.

15. The system of claim 13 further comprising:
an outer surface of the blade wherein the outer surface is curved, the curved surface located near the pivot aperture of the first blade wherein the pivot aperture is located near a longitudinal end of the blade.

16. A rotary mower blade system attachable to a spindle of a lawnmower, the system comprising:
an attachment arm extending along a longitudinal axis;
an attachment aperture providing access vertically through the attachment arm, the spindle passing vertically through the attachment aperture of the attachment arm to secure the attachment arm to the lawnmower;
a first retention body attachable to the attachment arm;
a retention aperture of the retention body extending on the longitudinal axis, wherein at least a portion of the attachment arm passes through the retention aperture of the retention body, the retention aperture sized to allow the retention body to slide longitudinally along the attachment arm;
a first end of the retention aperture having a first vertical height;
a second end of the retention aperture having a second vertical height of the retention aperture, wherein the first vertical height is less than the second vertical height, the first end spaced longitudinally apart from the second end, wherein the first end is positioned along the longitudinal axis closer to the center of the attachment arm than the second end;
a blade that inserts into the retention aperture of the retention body to secure the blade to the attachment arm, wherein both the blade and the attachment arm are located within the retention aperture, wherein the first vertical height prevents the blade from passing through the first end.

17. The system of claim 16 further comprising:
a pivot aperture of the blade allowing vertical access through the blade;
a pivot finger extending vertically downward from a bottom surface of the attachment arm, the pivot finger passing through the pivot aperture to secure the blade to the attachment arm.

18. The system of claim 17 further comprising:
a locking body secured to the bottom surface of the attachment arm;
a locking finger of the locking body that is vertically displaced below the attachment arm and the pivot finger, the locking finger extending longitudinally across the pivot finger such that the pivot finger is located between the attachment arm and the locking finger, the locking finger limiting movement of the retention body as the locking finger limits movement of the retention body across the locking finger at the first vertical height;
the blade secured between the attachment arm and the locking finger wherein the pivot finger passes through the pivot aperture of the blade to secure the blade to the attachment arm;
wherein at least a portion of the locking finger, the blade, and the attachment arm are located within the retention aperture wherein the retention body encompasses at least of a portion of the attachment arm, the blade, and the locking body.

* * * * *